(12) United States Patent
Sun

(10) Patent No.: US 10,705,863 B2
(45) Date of Patent: Jul. 7, 2020

(54) IOT BASED METHOD AND SYSTEM FOR PROCESSING INFORMATION

(71) Applicant: BEIJING BAIDU NETCOM SCIENCE AND TECHNOLOGY CO., LTD., Beijing (CN)

(72) Inventor: Leiming Sun, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 95 days.

(21) Appl. No.: 15/912,202

(22) Filed: Mar. 5, 2018

(65) Prior Publication Data

US 2019/0004831 A1    Jan. 3, 2019

(30) Foreign Application Priority Data

Jun. 30, 2017  (CN) .......................... 2017 1 0526897

(51) Int. Cl.

| | | |
|---|---|---|
| *G06F 9/00* | (2006.01) | |
| *G06F 3/048* | (2013.01) | |
| *G06F 16/00* | (2019.01) | |
| *G06F 9/451* | (2018.01) | |
| *G06N 5/02* | (2006.01) | |
| *G10L 15/18* | (2013.01) | |
| *H04W 4/70* | (2018.01) | |

(Continued)

(52) U.S. Cl.
CPC .............. *G06F 9/453* (2018.02); *G06F 3/167* (2013.01); *G06F 16/9038* (2019.01); *G06F 16/951* (2019.01); *G06N 3/006* (2013.01); *G06N 5/02* (2013.01); *G06N 5/022* (2013.01); *G06N 5/041* (2013.01); *G06Q 30/016* (2013.01); *G10L 15/1815* (2013.01); *H04L 43/045* (2013.01); *H04L 43/0817* (2013.01); *H04L 43/0876* (2013.01); *H04L 67/125* (2013.01); *H04W 4/70* (2018.02)

(58) Field of Classification Search
CPC .. H04W 4/00; G06F 3/00; G06F 3/048; G06F 3/01; G06F 9/00; G06F 16/00
See application file for complete search history.

(56) References Cited

U.S. PATENT DOCUMENTS

| | | | |
|---|---|---|---|
| 10,257,665 B2 * | 4/2019 | Goel ....................... | H04W 4/08 |
| 2010/0082365 A1 * | 4/2010 | Noordvyk ............. | G06Q 50/22 |
| | | | 705/2 |

(Continued)

FOREIGN PATENT DOCUMENTS

| | | |
|---|---|---|
| CN | 104883274 A | 9/2015 |
| CN | 105260778 A | 1/2016 |

(Continued)

*Primary Examiner* — Hugo Molina
(74) *Attorney, Agent, or Firm* — Seed IP Law Group LLP (57) ABSTRACT

Disclosed are an Internet of Things (IoT) based method and system for interacting with users. The intelligent customer service system collects and stores real-time status information of at least one device in an IoT; receives a request of a user; queries a device knowledge graph according to content of the request, and invoke the real-time status information of a related IoT device to acquire a corresponding request result, wherein the device knowledge graph is established according to usage information and/or maintenance information of one or more IoT devices; and return the request result to the user.

17 Claims, 3 Drawing Sheets

(51) Int. Cl.
*G06F 16/951* (2019.01)
*G06F 16/9038* (2019.01)
*H04L 12/26* (2006.01)
*G06N 3/00* (2006.01)
*G06Q 30/00* (2012.01)
*H04L 29/08* (2006.01)
*G06F 3/16* (2006.01)
*G06N 5/04* (2006.01)

(56) References Cited

U.S. PATENT DOCUMENTS

| | | | |
|---|---|---|---|
| 2015/0348554 A1* | 12/2015 | Orr | G10L 17/22 |
| | | | 704/275 |
| 2017/0308531 A1 | 10/2017 | Ma et al. | |
| 2017/0359695 A1* | 12/2017 | Aerts | G06F 3/04883 |
| 2018/0173184 A1* | 6/2018 | Kienzle | G05B 19/042 |

FOREIGN PATENT DOCUMENTS

| | | |
|---|---|---|
| CN | 105402989 A | 3/2016 |
| CN | 106202508 A | 12/2016 |
| CN | 106897273 A | 6/2017 |

\* cited by examiner

IOT BASED METHOD AND SYSTEM FOR PROCESSING INFORMATION

CROSS-REFERENCE TO RELATED APPLICATION

This application is related to and claims the priority from Chinese Application No. 201710526897.5, filed on Jun. 30, 2017, entitled "IoT Based Method and System for Interacting with Users,", the entire disclosure of which is incorporated herein by reference.

TECHNICAL FIELD

The present disclosure relates to the Internet of Things (IoT) technology, specifically relates to an IoT based technology for interacting with users.

BACKGROUND

By far, there are already some online customer service products on the market. These products mostly provide an online indexing and interactive Q&A ability by converting the existing knowledge into an online knowledge repository, thus improving the work efficiency and automation of the customer service.

However, these existing online customer service products mainly focus on the indexing of knowledge and the voice interaction to expand applications, and do not drill down to the real-time status layer of the specific devices. They cannot precisely locate problems and still belong to the empirical system category, having major blind zones and uncertainty. Moreover, the existing technical architecture also does not have the ability to automatically explore new knowledge paths and learn new knowledge by themselves.

SUMMARY

The objective of the present disclosure is to provide an IoT based method and system for interacting with users.

According to one aspect of the present disclosure, an IoT (Internet of Things) based method for interacting with users is provided, the method includes the following steps:
  collecting and storing real-time status information of at least one device in an IoT;
  wherein, the method further includes following steps:
  receiving a request of a user;
  querying a device knowledge graph according to content of the request, and invoking the real-time status information of the related IoT device to acquire a corresponding request result, wherein the device knowledge graph is established according to usage information and/or maintenance information of one or more IoT devices; and
  returning the request result to the user.

According to one aspect of the present disclosure, an IoT Internet of Things) based system for interacting with users is further provided, the system includes:
  a device configured to collect and store real-time status information of at least one device in an IoT;
  a device configured to receive a request of a user;
  a device configured to query a device knowledge graph according to content of the request, and invoke the real-time status information of the related IoT device to acquire a corresponding request result, wherein the device knowledge graph is established according to usage information and/or maintenance information of one or more IoT devices; and
  a device configured to return the request result to the user.

According to one aspect of the present disclosure, an IoT (Internet of Things) based system for interacting with users is further provided, wherein the system includes one or more storage devices and one or more processing devices, the storage devices storing computer programs thereon, the computer programs, when executed by the processing devices, the IoT based method for interacting with users according to one aspect of the present disclosure is implemented.

According to one aspect of the present disclosure, a computer readable storage medium is further provided, storing a computer program thereon, the computer program, when executed by one or more processing devices, implements the IoT based method for interacting with users according to one aspect of the present disclosure.

According to one aspect of the present disclosure, a computer program product is further provided, when the computer program product is executed by one or more computer devices, implements the IoT based method for interacting with users according to one aspect of the present disclosure.

Compared with the prior art, the present disclosure enables the user to acquire a better customer service experience. For example, the existing customer service systems often require users to describe problems by themselves, which can be unclear because the users are lack of experience/expertise, thus causing a slow locating or even misjudging of the problems. However, the present disclosure automatically investigates the problems by collecting the real-time status information of the IoT device and querying the device knowledge graph, to accurately locate the problem and provide the user with a suitable solution. In addition, in the existing customer service systems, the problems automatically answered by the machine are extremely limited, and a human customer service is often adopted, which makes the service time limited. And since the flow rate of the customer service is high, the training cost is also high and the effect is not good. The present disclosure automatically solves most of the user's problems by constructing the device knowledge graph and referring to the real-time status information of the device, which is obviously more efficient and intelligent.

Further, the present disclosure also supports the voice request of the user to identify the content of the request of the user through the voice recognition and the semantic analysis, so that the user can acquire a wider range of applicable scenarios without typing.

BRIEF DESCRIPTION OF THE DRAWINGS

After reading detailed descriptions of non-limiting embodiments with reference to the following accompanying drawings, other features, objectives and advantages of the present disclosure will be more apparent.

The same or similar reference numbers in the drawings refer to the same or similar components.

DETAILED DESCRIPTION OF EMBODIMENTS

Before discussing the exemplary embodiments in more detail, it should be mentioned that some exemplary embodiments are described as processes or methods depicted as flowcharts. Although the flowcharts describe various operations as sequential processes, many of these operations may be performed in parallel, concurrently, or simultaneously. In addition, the order of the various operations may be rearranged. The process may be terminated when its operation is completed, but may also have additional steps not included in the drawings. The processes may correspond to methods, functions, procedures, subroutines, subprograms, and the like.

A "computer device" as referred to in this context, which may also be referred to as a "computer," refers to an intelligent electronic device that may perform predetermined processing such as numerical calculations and/or logical calculations by running predetermined programs or instructions, which may include a processor and a memory. The processor executes a program instruction prestored in the memory to execute a predetermined processing, or executes a predetermined processing by hardware such as an ASIC, a FPGA, a DSP, or by a combination of the two. A computer device includes, but is not limited to, a server, a personal computer (PC), a laptop, a tablet, a smart phone and the like.

The computer device includes, for example, a user device and a network device. The user device includes, but is not limited to, a personal computer (PC), a laptop, a mobile terminal, and the like. The mobile terminal includes, but is not limited to, a smart phone, a PDA and the like. The network device includes, but is not limited to, a single network server, a server group consisting of multiple network servers or a cloud computing based cloud consisting of a large number of computers or network servers. Here, the cloud computing is a type of distributed computing, is a super virtual computer consisting of a group of loosely coupled computer sets. The computer device may operate alone to implement the present disclosure, also may access to the network, and implement the present disclosure by interacting with other computer devices in the network. The network in which the computing device is located includes but is not limited to the Internet, a wide area network, a metropolitan area network, a local area network, a VPN network and the like.

It needs to be noted that the user device, the network device, the network, and the like are merely examples, and other existing or future possible computer devices or networks may also be included in the protection scope of the present disclosure if applicable to the present disclosure, and incorporated by reference herein.

The methods discussed later herein (some of which are illustrated by flowcharts), may be implemented by hardware, software, firmware, middleware, microcode, hardware description language, or any combination thereof. When implemented by software, firmware, middleware or microcode, the program codes or code segments to implement the necessary tasks may be stored in a machine or a computer-readable medium (such as a storage medium.) The processor (s) may implement the necessary tasks.

The specific structural and functional details disclosed herein are merely representative and for the purpose of describing exemplary embodiments of the present disclosure. However, the present disclosure may be specifically implemented in many alternate forms, and should not be construed as limited only to the embodiments set forth herein.

It should be understood that, although the terms "first," "second," etc. maybe used herein to describe various units, these units should not be limited by these terms. These terms are used only to distinguish one unit from another. For example, a first unit may be referred as a second unit, and similarly a second unit may be referred to as a first unit, without departing from the scope of the exemplary embodiments. As used herein, the term "and/or" includes any and all combinations of one or more of the associated listed items.

It should be understood that when a unit is referred to as being "connected" or "coupled" to another unit, it may be directly connected or coupled to the other unit, or there may be an intervening unit. In contrast, when a unit is referred to as being "directly connected" or "directly coupled" to another unit, there is no intervening unit. Other words used to describe the relationship between the units should be interpreted in a similar manner (e.g., "between" compares with "directly between," "adjacent to" compares with "directly adjacent to.")

The terms used herein are for the purpose of describing specific embodiments only, rather than limiting the exemplary embodiments. As used herein, the singular forms "a," "an" also intend to include the plural forms as well, unless the context clearly indicates otherwise. It should also be understood that the terms "comprise" and/or "including" as used herein, specify the presence of the stated features, integers, steps, operations, units, and/or components, but do not preclude the presence or addition of one or more other features, integers, steps, operations, units, components, and/or combinations thereof.

It should also be mentioned that in some alternative implementations, the functions/actions mentioned may occur out of the order noted in the drawings. For example, two figures shown in succession may, in fact, be executed substantially concurrently or at times may be executed in the reverse order, depending on the functions/actions involved.

The present disclosure may be applied to various IoT-based intelligent life scenarios, typically such as smart home and smart car. However, those skilled in the art should understand that the foregoing application scenarios are merely exemplary, rather than limitative, and other application scenarios that are applicable to the solution of the present disclosure should also be included in the protection scope of the present disclosure. For the convenience of description, the following multi-purpose smart home, smart car and the like are used as examples in the present specification. However, those skilled in the art should understand that these examples are only for the purpose of illustrating and describing the present disclosure and should not be understood as any limitation to the present disclosure.

The present disclosure will be further described in detail below with reference to the accompanying drawings.

Figure 1:
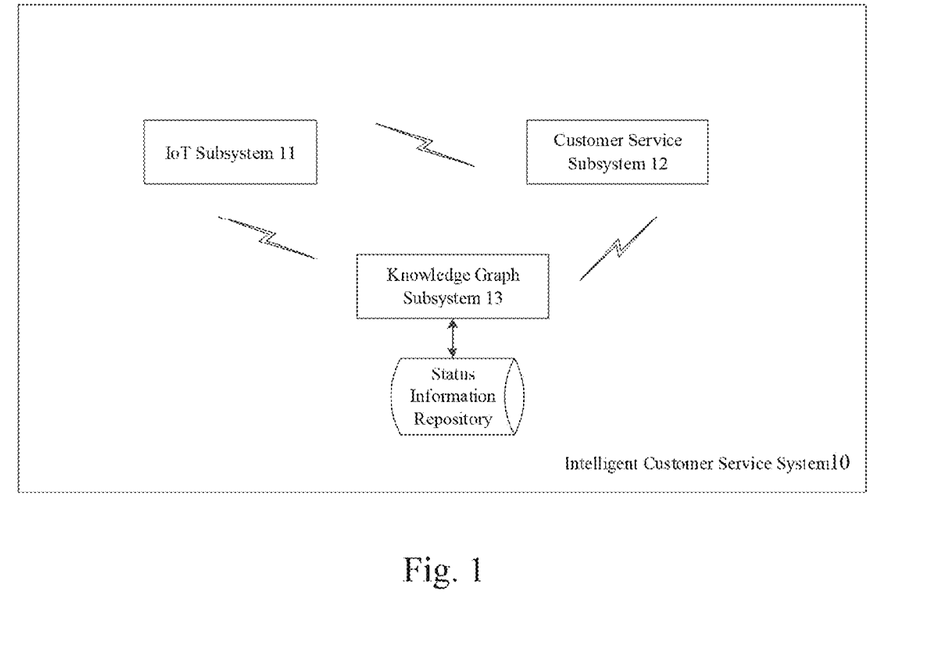
FIG. 1 shows a schematic diagram of an IoT based intelligent customer service system for interacting with users according to an embodiment of the present disclosure.

The present disclosure provides an IoT-based solution for interacting with users, which may be understood as an IoT-based intelligent customer service system interacting with users. Referring to FIG. 1, the intelligent customer service system 10 may use, for example, a cloud architecture, typically including such as an IoT subsystem 11, a customer service subsystem 12 and a knowledge graph subsystem 13. The IoT subsystem 11 collects and stores real-time status information of at least one device in an IoT. The customer service subsystem 12 queries a device knowledge graph according to the content of the request of the user, and invokes the real-time status information of the related IoT device to acquire a corresponding request result and return the request result to the user. The knowledge graph subsystem 13 maintains the device knowledge graph, wherein the device knowledge graph is established using the knowledge graph technology according to usage information and/or maintenance information of one or more IoT devices.

According to a preferred example of the present disclosure, the intelligent customer service system 10 may further include a voice recognition subsystem (not shown in FIG. 1) to support the voice request of the user. For example, the voice recognition subsystem receives a voice request of the user and performs a voice recognition and a semantic analysis on the voice request of the user to determine the content of the request of the user.

And, the request result returned to the user may also be in the form of voice, which is very convenient and safe in a smart car scenario.

Here, those skilled in the art should understand that each subsystem described above is only an example, and any computer system/function module that performs the functions described in the present disclosure may be considered as a corresponding subsystem of the intelligent customer service system. In addition, each of the above subsystems may also be a standalone system, which is regarded as a subsystem of the intelligent customer service system only when cooperating with each other to implement the solution of the present disclosure, and thus may be used as a subsystem of other systems when currently being used in other systems. For example, the above IoT subsystem may serve as a standalone system to collect and store real-time status information of at least one device in the IoT and perform other IoT related functions, and respond to the query request only when the intelligent customer service system requests the real-time status information of a certain device. Therefore, the present disclosure also does not limit the entities performing specific steps/functions in the intelligent customer service system.

Moreover, those skilled in the art should also understand that, from the user's point of view, each subsystem in the intelligent customer service system is invisible/imperceptible to the user, and the user interacts with the intelligent customer service system only, for example, submitting a request, acquiring a request result, without knowing the information processing procedure within the intelligent customer service system and the entities performing each information processing.

Figure 2:
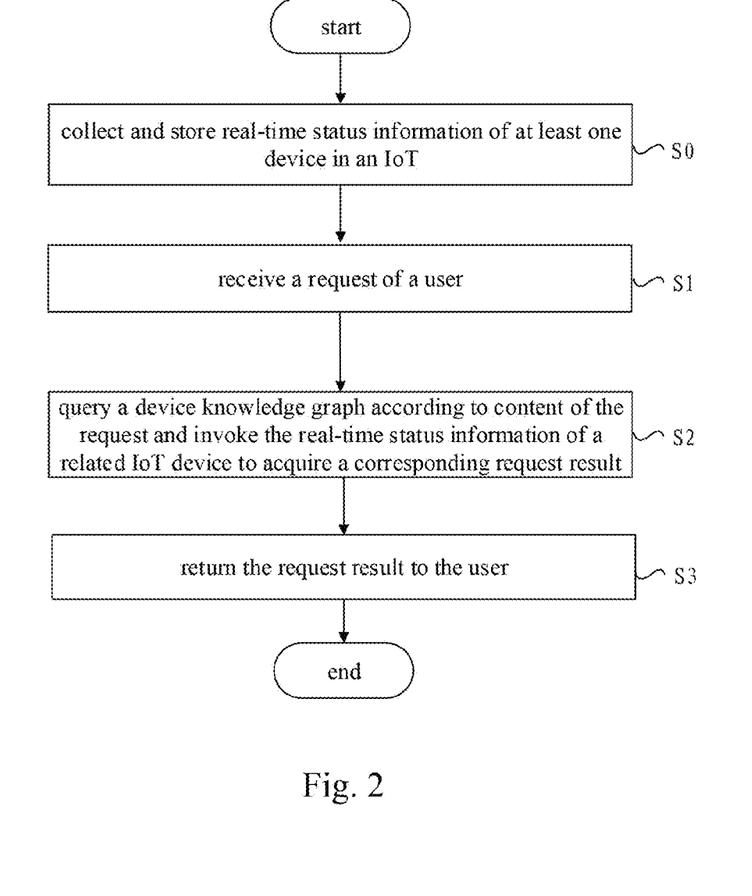
FIG. 2 shows a flowchart of an IoT based method for interacting with users according to an embodiment of the present disclosure.

FIG. 2 illustrates an embodiment of the present disclosure, which specifically shows a flowchart of an IoT based method for interacting with users in the intelligent customer service system.

With reference to FIG. 1 and FIG. 2, in step S0, the IoT subsystem 11 collects and stores real-time status information of at least one device in an IoT. In step S1, the customer service subsystem 12 receives a request of a user. In step S2, the customer service subsystem 12 queries a device knowledge graph according to content of the request and invokes the real-time status information of the related IoT device to acquire a corresponding request result, wherein the device knowledge graph is established according to usage information and/or maintenance information of one or more IoT devices. In step S3, the customer service subsystem 12 returns the request result to the user.

Figure 3:
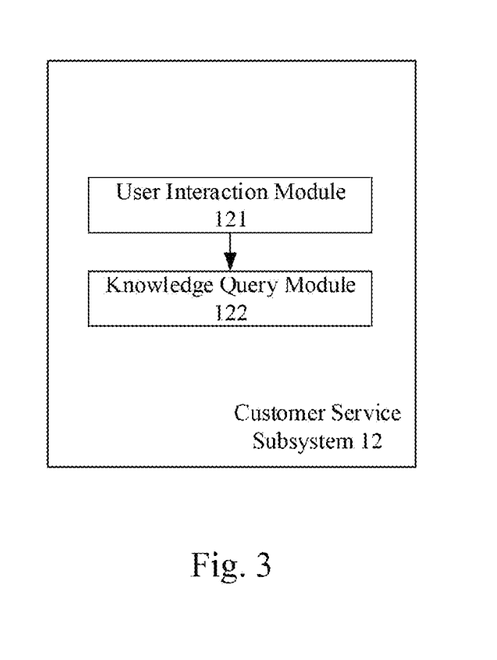
FIG. 3 shows a schematic diagram of a customer service subsystem according to an embodiment of the present disclosure.

Preferably, as shown in FIG. 3, the customer service subsystem 12 may further include a user interaction module 121 and a knowledge query module 122.

Here, the user interaction module 121 performs operations/functions related to the user exchange interaction, for example, receiving the request of the user and returning the request result to the user.

Referring back to FIG. 2, in step S0, the IoT subsystem 11 collects and stores the real-time status information of the IoT device at all times for the purpose of monitoring the IoT device and collecting historical data. The collection period of the real-time status information of different IoT devices may be determined by a specific device. For example, the collection period is relatively shorter for a device of rapid changing status, and the collection period is relatively longer for a device of a slow changing status.

In an IoT environment, all networked devices are equipped with multiple sensors to collect various status information of their own devices, such as various specific parameters, whether in a working status, whether in an on/off status. Usually, these sensors send the collected real-time status information to the local gateway, and the local gateway reports the information to the upper node, such as the IoT subsystem 11.

Here, the real-time status information of the IoT device should be understood in a broad sense, which includes not only the various real-time status information of the device itself, such as the current temperature and humidity in the refrigerator, but also the various real-time status information collected by the sensor on the device, such as in storage time and in storage time length of various foods in the refrigerator.

The real-time status information of the IoT device collected at each moment may be stored in a status information repository, in which all historical status information of the IoT devices may be stored. The status information repository is maintained by the IoT subsystem 11.

Steps S1-S3 are processes in which the customer service subsystem 12 provides intelligent customer service to the user in response to the request of the user. This process invokes the real-time status information of the IoT device related to the request.

Therefore, those skilled in the art should understand that there is no strict order relationship between step S0 and steps S1-S3. Actually, step S0 runs through the whole process of steps S1-S3 except that the real-time status information collected in step S0 may not be the real-time status information of the IoT device processed by the current steps S1-S3. For example, for a specific moment, step S0 currently collects the real-time status information of a smart refrigerator, and steps S1-S3 currently process the real-time status information of a smart air conditioner.

In step S1, the customer service subsystem 12 receives the request of the user. Here, the request of the user may be in various forms, such as a voice request, a text request, or a combination of the two. For a voice request of the user, the customer service subsystem 12 may transmit it to the voice recognition subsystem to perform a voice recognition and a semantic analysis on the voice request to determine the content of the request of the user.

The voice recognition and the semantic analysis may adopt any existing voice recognition technology and semantic analysis technology, in which the voice recognition is intended to convert voice content into text content, and the semantic analysis is intended to understand the content of the request of the user, for example, to acquire the content requested by the user through various natural language processing technologies. Any existing voice recognition technology and semantic analysis technology may be applicable to the present disclosure, which is not limited in the present disclosure.

In step S2, the customer service subsystem 12 queries the device knowledge graph according to the content of the request of the user and invokes the real-time status information of the related IoT device to acquire the corresponding request result.

Here, the request result is determined by the knowledge point acquired from the query and the real-time status information of the related IoT device. Specifically, the request result may include, for example, use help, fault location, and the like.

Here, the device knowledge graph is established according to the usage information and/or the maintenance information of one or more IoT devices. Specifically, the device knowledge graph is constructed by the knowledge graph technology. The knowledge graph subsystem 13 is configured to excavate knowledge points and explore relations between the knowledge points from the usage information and/or the maintenance information of various IoT devices, so as to construct a knowledge network of the IoT devices. For example, knowledge excavating, knowledge calculating, knowledge indexing and expressing may be conducted through the machine learning and other methods from the product usage manual, the maintenance manual, the FAQ, the historical call records of the human customer service, etc., to excavate the knowledge points, establish relevance between the knowledge points, assign weights for the knowledge points and construct output statements, etc., making it possible to accurately construct the best knowledge path for a variety of specific scenarios, that is, the methods and steps to solve the problems.

Further, the device knowledge graph can also record knowledge according to the user feedback, the device status feedback, etc., to self-study and enhance itself unceasingly. For example, when the problem is solved, the knowledge graph subsystem 13 may update the weight of the current answer (knowledge point) according to the user feedback and/or the device status feedback. In another example, when the device knowledge graph fails to hit the answer to the relevant question, the customer service subsystems 12 may be transferred to the human customer service, so that the knowledge graph subsystem 13 records knowledge through the analysis of the conversation content between the user and the customer service, for example, excavates knowledge points, associates with the existing knowledge points, and assigns weights, etc. Here, the questions and answers are all considered as knowledge points and are related to each other.

Here, the device knowledge graph may serve as a separate knowledge network serving for any requesting device.

For example, for the request of the user "the refrigerator does not refrigerate," a traditional customer service system can only inform the user by experience, for example, according to: whether the refrigerator door is closed→the real-time refrigeration level in the refrigerator→whether the compressor is properly functioning→whether the refrigerant leaks, for the user to investigate possible cause of the problem one by one. However, the intelligent customer service system of the present disclosure may query the device knowledge graph to acquire various possible causes, and invoke the real-time status information of the relevant device to automatically investigate until the cause for not refrigerating is determined, such as the compressor fails to function properly.

Here, after the customer service subsystem 12 determines the cause of the problem, it continues to acquire the corresponding solution from the device knowledge graph. For example, the customer service subsystem 12 may directly report for repair to the service center for the cause "the compressor fails to function properly."

In step S3, the customer service subsystem 12 returns the acquired request result to the user. For example, the customer service subsystem 12 notifies the user "the compressor fails to function properly, we have already reported for repair to the service center."

Here, the returned request result may also be in the form of voice, text, or a combination of both, and may depend on the current status of the user (such as whether the user is driving a car or in other inconvenient status for viewing a text message) or the form of the request submitted by the user (such as returning a voice result to a voice request.)

In a smart life scenario, the request of the user is typical, for example, a usage related request and a fault related request.

Taking the smart car as an example, a usage help request such as "where is the sunroof switch" and "how to turn on the audio system," and a fault repair request such as "fault light on," "air conditioning not cooling," "headlight off" and "unable to start," etc.

Example 1, for the help request, the intelligent customer service system queries the device knowledge graph to acquire usage help, and invokes the real-time status information of the related device to return the acquired result to the user. Preferably, the intelligent customer service system may guide the user and provide specific usage help through multiple interactions.

For example, the user requests for help: "How to turn on the high beam headlights?"

The intelligent customer service system queries the device knowledge graph, acquires the corresponding knowledge point and reads the current status of the high beam headlights to be "not turned on," so inform the user: "Please push forward the bar on the left of the steering wheel to turn on the long-time high beam headlights, push back the bar to turn on the short-time high beam headlights. For your own safety, do not turn on the high beam headlights if not necessary. Do you want to turn on the high beam headlights for now?"

The ser replies: "Ok, thanks!"

The intelligent customer service system turns on the lights, and informs the user: "we have already turned on the high beam headlights for you, wish you have a happy journey!"

In this example 1, the request result acquired by the help request of the user is the corresponding usage help. The intelligent customer service system refers to the current status of the related device, and the returned usage help not only informs the user how to turn on the high beam headlights by repeatedly interacting with the user, but also directly performs the control operation on the corresponding device, that is, turns on the high beam headlights, since it knows the current status of the high beam headlights, and have inquired the user whether it is necessary to turn on the high beam headlights and confirmed with the user.

Example 2, for the repair request, the intelligent customer service system queries the device knowledge graph and invokes the real-time status information of the related device to acquire the problem location and its solution, and returns them to the user.

For example, the user reports for repair: "Why does the air conditioning not cooling/useless?"

The intelligent customer service system queries the device knowledge graph, and acquires possible causes including "the user does not know how to use," "the door is not properly closed," "the compressor fails," "the refrigerant leaks," and invokes the related real-time parameters, thus, 1) If all the parameters are detected to be normal, it may be determined that "the user does not know how to use," and the usage help may be returned to the user.

2) From the knowledge point "the door is not properly closed," if the related parameters are invoked, ①locate the problem as "forget to close the door," then the user may be reminded. Preferably, the intelligent customer service system may further inquire the user whether it is necessary to set a "door closing reminder." ②If the problem is located as "the door lock is broken," a repair order may be sent to a 4S shop and the user is informed.

3) From the knowledge point "the compressor fails," if the related parameters are invoked and the problem is located as "the compressor does not make any sound," a repair order may be sent to a 4S shop and the user is informed.

4) From the knowledge point "the refrigerant leaks," if the related parameters are invoked and the problem is located as "loud fan noise," then a repair order may be sent to a 4S shop and the user is informed.

Preferably, after locating the problem and acquiring the solution, the intelligent customer service system may also only propose the solution to the user, and execute the solution after the user confirms it. For example, the intelligent customer service system may inform the user "The system shows that your compressor is in an abnormal status, so it is recommended that you have it overhauled in a 4S shop. Whether to go to the nearby 4S shop?" After the user confirms, the intelligent customer service system may send a repair order to the 4S shop, and may also provide the user with navigation information to the 4S shop.

Example 3, the user may also propose a maintenance consulting related request.

For example, the user inquires: "The next maintenance mileage should be how many kilometers?"

The intelligent customer service system queries the device knowledge graph, acquires the corresponding knowledge point (the last maintenance date is Jan. 1, 2017, the next maintenance mileage should be 37,000 kilometers), and reads the current mileage to be 32,000 kilometers, thus informs the user: "The last maintenance date was Jan. 1, 2017 and the current mileage is 32,000 kilometers. According to the maintenance manual, the next maintenance mileage should be 37,000 kilometers. Do you want a reminder ahead of time?"

The user replies: "Ok, remind me when it's the time."

The intelligent customer service system sets the corresponding reminder, and informs the user: "We have set the reminder for you, and will remind you at the time of 200 kilometers to the next maintenance mileage."

Example 4, for the knowledge points not yet included in the device knowledge graph, the intelligent customer service system may request the result an external service/database to acquire the result, and the device knowledge graph may perform knowledge recording on the result through the machine learning.

For example, the user inquires: "When to use the D gear and when to use the S gear?"

The intelligent customer service system queries the device knowledge graph, fails to acquire the corresponding knowledge point, then the problem is submitted to the search engine and a corresponding search result is acquired. The device knowledge graph excavates the knowledge point from the search result, and performs the knowledge recording.

Next time the user inquires again: "When to use the D gear and when to use the S gear?"

The intelligent customer service system queries the device knowledge graph, acquires the corresponding knowledge point, and informs the user: "S is the sports gear, which accelerates faster, but also more fuel-consuming. D gear is the normal driving mode, which accelerates slower than the S gear, but more fuel-efficient." Here, the intelligent customer service system may combine the current average fuel consumption of the user, to advise the user to use the D gear to save fuel.

In a broad sense, the request result may be understood as the problem location and its solution. For example, for a help request from the user, the provided usage help may be understood as a user usage problem (does not how to use) and its solution (how to use). For a request for fault repair, it is even more so. In addition, for a request such as a maintenance consulting, the result provided also includes the problem location (maintenance related) and its solution (default or critical reminder).

According to a preferred example of the present disclosure, the IoT subsystem 11 does not only passively collect and store the real-time status information of the IoT device, but may proactively process the collected real-time status information, for example, detect abnormal status, recommend related information, etc.

For example, in an abnormal status detection scenario, whenever the IoT subsystem 11 collects the real-time status information of at least one IoT device, it queries the device knowledge graph to detect whether these IoT devices are in abnormal status, and when the status is abnormal, locates the problem, then informs the user of the abnormal device of the located problem.

Specifically, in Example 1, when the intelligent customer service system currently collects the real-time status information of an IoT device (for example, the current internal temperature of a refrigerator is 15° C.), it queries the device knowledge graph to determine whether the collected real-time status information is in a normal status (should be lower than 10° C.), and if the information is not in a normal status, it is determined that the status of the IoT device is abnormal, and the problem location is performed according to the corresponding knowledge path. If the problem is determined as "the current internal refrigerating level is too low," then the intelligent customer service system provides the located problem and its solution together to the user, "the current internal refrigerating level is too low, it is recommended to adjust the refrigerating level to 5."

Example 2, the intelligent customer service system currently collects the right rear tire pressure of the vehicle to be 1.9 mp, queries the device knowledge graph and finds it below the normal value, then notifies the user "Please note that the left front tire pressure of the vehicle is 3.5 mp, which is higher than the normal value, to ensure safe driving, it is recommended that you overhaul the vehicle as soon as possible."

Example 3, the intelligent customer service system collects the current mileage to be 36,800 kilometers, queries the device knowledge graph and finds the next maintenance mileage should be 37,000 kilometers, then notifies the user "Your car's next maintenance mileage should be 37,000 kilometers, the current mileage is 36,800 kilometers, please pay attention to promptly go to the 4S shop for maintenance."

In another example, the IoT subsystem 11 queries the device knowledge graph according to the real-time status information of at least one IoT device to acquire the best status information of these IoT devices, and further, sends related prompt information to the user to which the corresponding IoT device belongs based on the best status information.

Specifically, for example, when the intelligent customer service system collects the storage during of the vegetables in the refrigerator to be 5 days and queries the device knowledge graph to acquire the best status information of these IoT devices (for example, the fresh storage period of the vegetables is seven days), it reminds the user that the vegetables are about to expire.

Preferably, the prompt information includes service recommendation information. For example, for expired vegetables, the intelligent customer service system may also provide the user with a related purchase link for vegetables.

According to a preferred example of the present disclosure, if the customer service subsystem 12 determines the request of the user is an external service, it transfers the request to the entrance of the corresponding external service to acquire an initial request result. Then, according to the initial request result, it queries the device knowledge graph, invokes the real-time status information of the related IoT device to acquire a final request result.

Here, the introducing of the external service/database may support the service extension of the intelligent customer service system to accommodate a wide range of requests of the user.

For example, the intelligent customer service system may query the device knowledge graph, for a request related to the IoT devices, such as a request related to the use of the devices, and a request related to the maintenance of the devices. For the external service not provided by the intelligent customer service system, if an external service request of the user is received, such as a navigation request, the intelligent customer service system may transfer the request to the corresponding external service/database to acquire a corresponding preliminary request result.

Specifically, taking the navigation request as an example, the intelligent customer service system may acquire an initial request result (such as driving navigation information) from a map service according to the navigation request of the user, and then query the device knowledge graph according to the navigation information and invoke the real-time status information of the vehicle, to acquire a final request result.

For example, the user requests: "Navigate for me to the destination XX."

The intelligent customer service system acquires three routes from the map service, and provides the routes for the user to choose: "Route one: high-speed priority, mileage 232 kilometers, takes about 1 hour and 46 minutes; Route two: avoid the expressway, mileage 285 kilometers, takes about 2 hours and 15 minutes; Route 3: distance priority, mileage 210 kilometers, takes about 2 hours and 23 minutes. Please choose the route."

The user chooses the route one.

The intelligent customer service system queries the device knowledge graph (based on historical fuel consumption, estimates whether the fuel is sufficient), checks current remaining fuel, finds the fuel is insufficient, and thus informs the user: "We have set route one for navigation, the estimated mileage is 200 kilometers. Your fuel is in shortage and may not be enough to travel to the destination, it is recommended that you refuel first." Preferably, the system may further inquire "Do you need to navigate to the nearest gas station?"

According to a preferred example of the present disclosure, the present disclosure further takes into account that when the intelligent customer service system cannot provide the user with the request result through the machine answering mode, the manual service is introduced to ensure the needs in this respect.

Specifically, for the service provided by the intelligent customer service system, if the customer service subsystem 11 queries the device knowledge graph and fails to acquire a corresponding request result, the manual service is introduced and the conversation content of the manual service is recorded; the knowledge point of this processing is extracted from the recorded conversation content, and the device knowledge graph is updated accordingly.

For example, if the intelligent customer service system queries the device knowledge graph and fails to acquire the corresponding request result, the user is transferred to the manual service and the voice content of the manual service is recorded. The keywords and the solution are extracted and further updated to the device knowledge graph, such as adding new knowledge points, optimizing/updating the knowledge paths of the related knowledge points.

Preferably, in order to acquire related knowledge points more accurately from the content of the manual service, the manual annotation may be introduced to annotate the voice content of the manual service, such as labeling keywords and solutions, and updating the annotation result to the device knowledge graph.

By studying the content of the manual service, the intelligent customer service system establishes a feedback mechanism for the device knowledge graph, enriches the knowledge points and optimizes the knowledge paths unceasingly, thus achieves the goal of self-study and enhancing, and eventually realizes a greater data volume and a stronger data processing ability.

It should be noted that the present disclosure may be implemented in software and/or a combination of software and hardware. For example, each device of the present disclosure may be implemented by an Application Specific Integrated Circuit (ASIC) or any other similar hardware device. In an embodiment, the software programs of the present disclosure may be executed by a processor to implement the steps or functions described above. Similarly, the software programs of the present disclosure, including related data structures, may be stored in a computer readable recording medium, such as, a RAM memory, a magnetic or optical driver or a floppy disk, and similar devices. In addition, some steps or functions of the present disclosure may be implemented by hardware, for example, as a circuit cooperating with the processor to perform various steps or functions.

It is apparent to those skilled in the art that the present disclosure is not limited to the details of the foregoing exemplary embodiments, and the present disclosure can be implemented in other specific forms without departing from the spirit or essential characteristics of the present disclosure. Thus, the embodiments are to be considered in all respects as illustrative rather than restrictive, the scope of the present disclosure being indicated by the appended claims rather than by the foregoing description, thus it is intended that all changes that come within the meaning and range of equivalency elements of the claims should be included in the present disclosure. Any reference signs in the claims should not be construed as limiting the referred claims. In addition, it is obvious that the word "comprising" does not exclude other units or steps, and the singular does not exclude the plural. A plurality of units or devices stated in the system claims may also be implemented by one unit or device in software or hardware. The terms first, second and the like are used to denote names and do not represent any particular order.

What is claimed is:

1. An Internet of Things (IoT) based method for interacting with users, the method comprising:
    collecting and storing real-time status information of at least one device in an IoT;
    wherein, the method further comprises:
        receiving a request of a user;
        querying a device knowledge graph according to content of the request to acquire a knowledge point, invoking the stored real-time status information of a related device in the IoT, and determining a corresponding request result based on the acquired knowledge point and the invoked real-time status information of the related device in the IoT, wherein the device knowledge graph is established according to usage information and/or maintenance information of one or more devices in the IoT; and
        returning the request result to the user.

2. The method according to claim 1, wherein the method further comprises:
    querying the device knowledge graph to detect whether the device in the IoT is in an abnormal status, and performing a fault location when the device in the IoT is in an abnormal status, when the real-time status information of the at least one device in the IoT is collected; and
    notifying a user of an abnormal device of a located problem.

3. The method according to claim 1, wherein the method further comprises:
    querying the device knowledge graph according to the real-time status information of the at least one device in the IoT to acquire best status information of the device in the IoT; and
    sending related prompt information to a user belonging to the device in the IoT based on the best status information.

4. The method according to claim 3, wherein the prompt information comprises service recommended information.

5. The method according to claim 1, wherein the acquiring a request result specifically comprises:
    transferring the request to an external service to acquire an initial request result; and
    querying the device knowledge graph according to the initial request result, and invoking the real-time status information of the related device in the IoT to acquire a final request result.

6. The method according to claim 5, wherein the external service comprises a map service and the initial request result comprises navigation information.

7. The method according to claim 1, wherein the method further comprises:
    introducing a manual service, in response to failing to acquire the corresponding request result by querying the device knowledge graph;
    recording voice content of the manual service to extract a processing result; and
    updating the device knowledge graph according to the content of the request and the processing result.

8. The method according to claim 1, wherein the request of the user comprises a voice request;
    wherein, the receiving a request of a user specifically comprises:
        receiving the voice request of the user; and
        performing a voice recognition and a semantic analysis on the voice request to determine the content of the request of the user.

9. An Internet of Things (IoT) based system for interacting with users, the system comprising:
    at least one processor; and
    a memory storing instructions, which when executed by the at least one processor, cause the at least one processor to perform operations, the operations comprising:
        collecting and storing real-time status information of at least one device in an IoT;
        wherein, the operations further comprise:
            receiving a request of a user;
            querying a device knowledge graph according to content of the request to acquire a knowledge point, invoking the stored real-time status information of a related device in the IoT, and determining a corresponding request result based on the acquired knowledge point and the invoked real-time status information of the related device in the IoT, wherein the device knowledge graph is established according to usage information and/or maintenance information of one or more devices in the IoT; and
            returning the request result to the user.

10. The system according to claim 9, wherein the operations further comprise:
    querying the device knowledge graph to detect whether the device in the IoT is in an abnormal status, and performing a fault location when the device in the IoT is in an abnormal status, when the real-time status information of the at least one device in the IoT is collected; and
    notifying a user of an abnormal device of a located problem.

11. The system according to claim 9, wherein the operations further comprise:
    querying the device knowledge graph according to the real-time status information of the at least one device in the IoT to acquire best status information of the device in the IoT; and
    sending related prompt information to a user belonging to the device in the IoT based on the best status information.

12. The system according to claim 11, wherein the prompt information comprises service recommended information.

13. The system according to claim 9, wherein the acquiring a request result specifically comprises:
    transferring the request to an external service to acquire an initial request result; and
    querying the device knowledge graph according to the initial request result, and invoke the real-time status information of the related device in the IoT to acquire a final request result.

14. The system according to claim 13, wherein the external service comprises a map service and the initial request result comprises navigation information.

15. The system according to claim 9, wherein the operations further comprise:

introducing a manual service, min response to failing to acquire the corresponding request result by querying the device knowledge graph;

extracting related knowledge points of a processing this time from recorded conversation content of the manual service; and updating the device knowledge graph based on the extracted knowledge points.

16. The system according to claim 9, wherein the request of the user comprises a voice request;

wherein, the receiving a request of a user specifically comprises:

receiving the voice request of the user; and performing a voice recognition and a semantic analysis on the voice request to determine the content of the request of the user.

17. A non-transitory computer storage medium storing a computer program, which when executed by one or more processors, causes the one or more processors to perform operations, the operations comprising:

collecting and storing real-time status information of at least one device in an IoT;

receiving a request of a user;

querying a device knowledge graph according to content of the request to acquire a knowledge point, invoking the stored real-time status information of a related device in the IoT, and determining a corresponding request result based on the acquired knowledge point and the invoked real-time status information of the related device in the IoT, wherein the device knowledge graph is established according to usage information and/or maintenance information of one or more devices in the IoT; and returning the request result to the user.

* * * * *

UNITED STATES PATENT AND TRADEMARK OFFICE
CERTIFICATE OF CORRECTION

PATENT NO.       : 10,705,863 B2                                     Page 1 of 1
APPLICATION NO.  : 15/912202
DATED            : July 7, 2020
INVENTOR(S)      : Leiming Sun It is certified that error appears in the above-identified patent and that said Letters Patent is hereby corrected as shown below:

In the Claims

Column 15, Claim 15, Line 1:
"service, min response to"
Should be:
--service, in response to--.

Signed and Sealed this
Eighth Day of December, 2020

Andrei Iancu
*Director of the United States Patent and Trademark Office*